United States Patent
Kolvick et al.

(10) Patent No.: US 9,298,389 B2
(45) Date of Patent: Mar. 29, 2016

(54) OPERATING A MEMORY MANAGEMENT CONTROLLER

(71) Applicant: LENOVO ENTERPRISE SOLUTIONS (SINGAPORE) PTE. LTD., Singapore (SG)

(72) Inventors: Randolph S. Kolvick, Durham, NC (US); Makoto Ono, Chapel Hill, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/064,673

(22) Filed: Oct. 28, 2013

(65) Prior Publication Data

US 2015/0121023 A1    Apr. 30, 2015

(51) Int. Cl.
G06F 13/12       (2006.01)
G06F 13/38       (2006.01)
G06F 3/06        (2006.01)

(52) U.S. Cl.
CPC ............ *G06F 3/0647* (2013.01); *G06F 3/0604* (2013.01); *G06F 3/0683* (2013.01)

(58) Field of Classification Search
None
See application file for complete search history.

(56) References Cited

U.S. PATENT DOCUMENTS

| | | | |
|---|---|---|---|
| 5,619,675 A * | 4/1997 | De Martine et al. | 711/133 |
| 5,778,442 A * | 7/1998 | Ezzat et al. | 711/159 |
| 5,918,249 A | 6/1999 | Cox et al. | |
| 6,073,225 A * | 6/2000 | James et al. | 711/202 |
| 6,898,690 B2 | 5/2005 | Ramagopal et al. | |
| 7,512,769 B1 | 3/2009 | Lowell et al. | |
| 8,321,646 B2 | 11/2012 | Davies | |
| 8,886,882 B2 * | 11/2014 | Nakajima | 711/117 |
| 2007/0074067 A1 | 3/2007 | Rothman et al. | |
| 2007/0198796 A1 * | 8/2007 | Warren, Jr. | 711/165 |
| 2007/0214333 A1 | 9/2007 | Nijhawan et al. | |
| 2008/0307192 A1 | 12/2008 | Sinclair et al. | |
| 2011/0010514 A1 * | 1/2011 | Benhase et al. | 711/162 |
| 2012/0079232 A1 | 3/2012 | Hinton et al. | |
| 2012/0290768 A1 * | 11/2012 | Rubowitz | 711/103 |

(Continued)

OTHER PUBLICATIONS

Palem, K., et al., "Design Space Optimization of Embedded Memory Systems via Data Remapping", Proceedings of the Languages, Compilers, and Tools for Embedded Systems and Software and Compilers for Embedded Systems, Jun. 19-21, 2002, pp. 28-37, vol. 37 Issue 7, ACM New York, NY, USA, DOI: 10.1145/513829.513836.

(Continued)

*Primary Examiner* — Elias Mamo
(74) *Attorney, Agent, or Firm* — Edward J. Lenart; Katherine S. Brown; Kennedy Lenart Spraggins LLP

(57) ABSTRACT

A memory management controller operatively coupled to a plurality of memory modules, the memory management controller including processing logic configured to: identify a plurality of memory tiers in the plurality of memory modules, each memory tier characterized by different operational characteristics; allocate a spare block of memory in each memory tier; identify a data characteristic for each of the one or more blocks of data in a plurality of memory tiers; migrate, in dependence upon the operational characteristics of each memory tier and the data characteristic for each of the one or more data blocks in the plurality of memory tiers, data in a first memory tier to the spare block of memory in a second memory tier; and migrate data in the second memory tier to the spare block of memory in the first memory tier.

9 Claims, 7 Drawing Sheets

(56) References Cited

U.S. PATENT DOCUMENTS

2012/0290779 A1 11/2012 Eleftheriou et al.
2013/0046920 A1 2/2013 Ryu et al.
2013/0124780 A1* 5/2013 Baderdinni et al. .......... 711/103
2014/0129718 A1* 5/2014 Ono .............................. 709/226

OTHER PUBLICATIONS

Yang, J., et al., "A low-cost memory remapping scheme for address bus protection", Journal of Parallel and Distributed Computing, May 2010, pp. 443-457, vol. 70, Issue 5, Elsevier Inc. DOI: http://dx.doi.org/10.1016/j.jpdc.2009.11.008.

Kuo, C., et al., "AS-COMA: An Adaptive Hybrid Shared Memory Architecture ", Series: University of Utah Computer Science Technical Report, UUCS-98-010, Mar. 23, 1998, pp. 1-26, International Association for Bridge and Structural Engineering (IABSE), Zurich, Switzerland, USpace Institutional Repository Identifier: ir-main,15969.

Wikipedia, "CPU cache—Wikipedia, the free encyclopedia," http://en.wikipedia.org/wiki/CPU_cache, accessed Apr. 3, 2013, pp. 1-22.

Dattani, K., et al.,"Data Tier Caching for SOA Performance", Part of the Oracle Fusion Middleware Patterns article series., http://www.oracle.com/technetwork/articles/soa/data-tier-caching-for-soa-101753.html, Published Feb. 2010, Oracle, accessed Apr. 3, 2013, pp. 1-7.

Sudan, K. et al., "Tiered Memory: An Iso-Power Memory Architecture to Address the Memory Power Wall," IEEE Transactions on Computers, Dec. 2012, pp. 1697-1710, vol. 61, Issue 12, IEEE Xplore Digital Library. DOI: 10.1109/TC.2012.119.

Wikipedia, "Hierarchical storage management", http://en.wikipedia.org/wiki/Hierarchical_storage_management, accessed Apr. 4, 2013, pp. 1-2.

* cited by examiner

OPERATING A MEMORY MANAGEMENT CONTROLLER

BACKGROUND OF THE INVENTION

1. Field of the Invention

The field of the invention is data processing, or, more specifically, methods, apparatus, and products for operating a memory management controller.

2. Description of Related Art

Modern computing systems can incorporate a wide range of memory types. Modern computers can include, for example, main memory, flash memory, disk storage, and other types of memory. Each type of memory may perform differently in terms of read and write times, in terms of whether the memory is volatile, and so on. Because each type of memory may perform differently, it is valuable to total system performance to utilize each form of memory appropriately.

SUMMARY OF THE INVENTION

A memory management controller operatively coupled to a plurality of memory modules, the memory management controller including processing logic configured to: identify a plurality of memory tiers in the plurality of memory modules, each memory tier characterized by different operational characteristics; allocate a spare block of memory in each memory tier; identify a data characteristic for each of one or more blocks of data in a plurality of memory tiers; migrate, in dependence upon the operational characteristics of each memory tier and the data characteristic for each of the one or more data blocks in the plurality of memory tiers, data in a first memory tier to the spare block of memory in a second memory tier; and migrate, in dependence upon the operational characteristics of each memory tier and the data characteristic for each of the one or more data blocks in the plurality of memory tiers, data in the second memory tier to the spare block of memory in the first memory tier.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
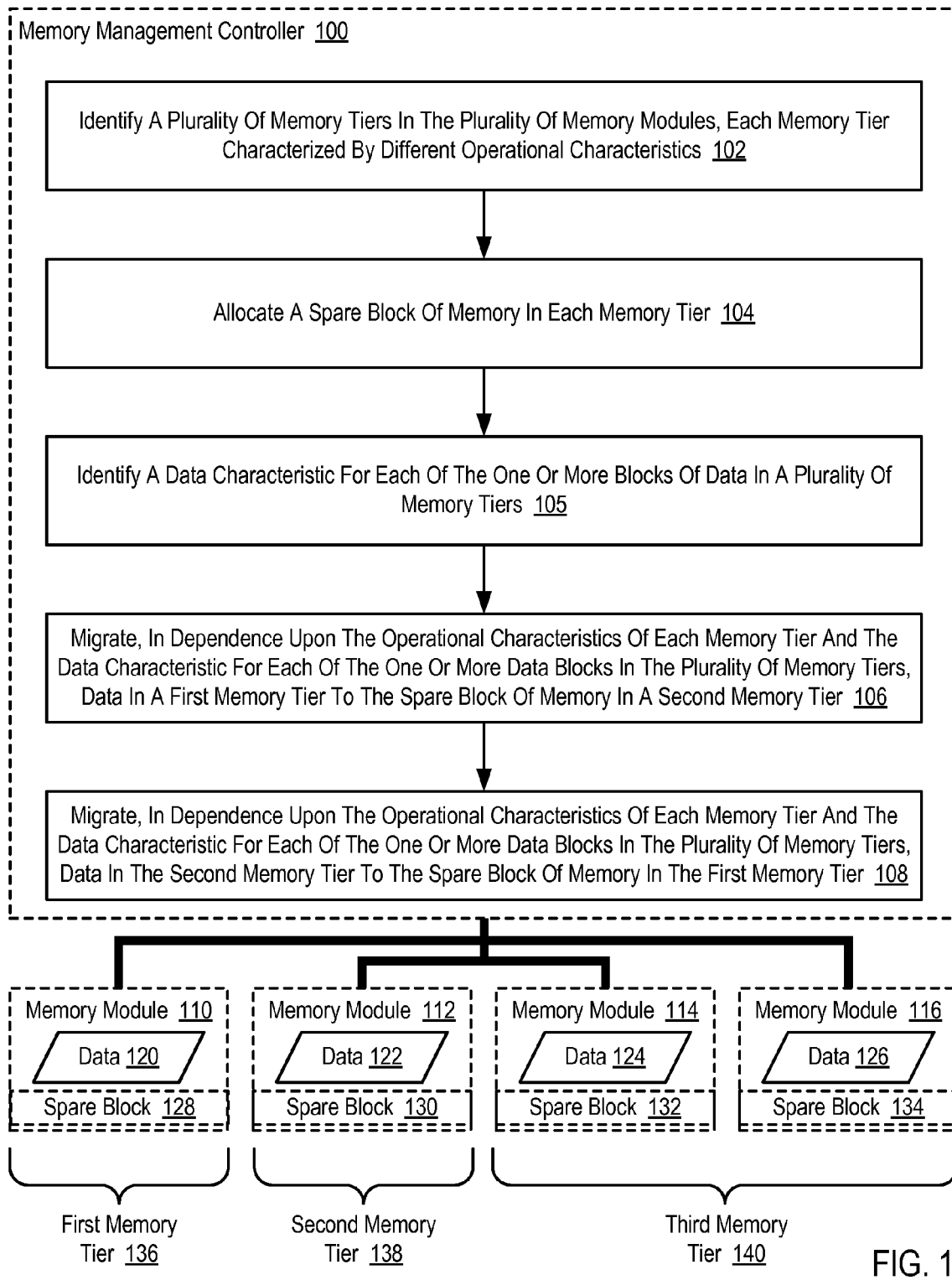
FIG. 1 sets forth a flow chart illustrating an example method for operating a memory management controller according to embodiments of the present invention.

Example methods, apparatuses, and products for operating a memory management controller in accordance with the present invention are described with reference to the accompanying drawings, beginning with FIG. 1. FIG. 1 sets forth a flow chart illustrating an example method for operating a memory management controller (100) according to embodiments of the present invention. In the example method of FIG. 1, the memory management controller (100) may be embodied as automated computing machinery such as an application-specific integrated circuit ('ASIC'), field programmable gate array ('FPGA'), and so on.

The memory management controller (100) of FIG. 1 is operatively coupled to one or more memory modules (110, 112, 114, 116), for example, via a memory bus. The one or more memory modules (110, 112, 114, 116) of FIG. 1 may be embodied, for example, as a dual in-line memory module ('DIMM'), single in-line memory module ('SIMM'), dynamic random-access memory ('DRAM') DIMM, synchronous dynamic random-access memory ('SDRAM') DIMM, storage class memory ('SCM') DIMM, or other form of computer memory. In the example method of FIG. 1, the memory management controller (100) may therefore facilitate memory access requests between the memory modules (110, 112, 114, 116) and other computing hardware such as a central processing unit ('CPU'). Although the memory management controller (100) of FIG. 1 is depicted as being directly connected to the memory modules (110, 112, 114, 116), readers will appreciate that the memory management controller (100) of FIG. 1 may be indirectly connected to the memory modules (110, 112, 114, 116), for example, through additional memory management modules (not shown).

The example method of FIG. 1 includes identifying (102), by the memory management controller (100), a plurality of memory tiers (136, 138, 140) in the plurality of memory modules (110, 112, 114, 116). Each memory tier (136, 138, 140) in the example of FIG. 1 is characterized by different operational characteristics. Such operational characteristics can include, for example, the amount of time required to service a memory access request, the expected amount of times a memory module (110, 112, 114, 116) may be written to prior to wearing out or failing, whether the memory module (110, 112, 114, 116) represents non-volatile storage or volatile storage, and so on. In such a way, memory modules (110, 112, 114, 116) that include identical operational characteristics may be grouped into the same memory tier (136, 138, 140).

Consider an example in which the relevant operational characteristic is the amount of time required to service a memory access request. In such an example, assume that memory modules (114, 116) are SDRAM DIMMs that are directly connected to the memory management controller over identical memory buses that are identical in length. In addition, assume that memory module (112) is an SCM indirectly coupled to the memory management controller (110) through another memory management controller (not shown) and memory module (110) is a SDRAM DIMM indirectly coupled to the memory management controller (100) through the same memory management controller (not shown) as memory module (112). In such an example, memory modules (114, 116) may service a memory access request in the same amount of time and therefore may represent one memory tier (140). In addition, memory module (110) may service a memory access request in a longer period of time than memory modules (114, 116) as memory module (110) is not directly coupled to the memory management controller (100). Furthermore, memory module (112) may require even more time than memory module (110) to service a memory access request as memory module (112) is a slower form of memory (SCM DIMM) than memory module (110) (SDRAM DIMM). In such a way, memory module (110) may represent a memory tier (136) and memory module (112) may represent an additional memory tier (138). As such, identifying (102) a plurality of memory tiers (136, 138, 140) in the plurality of memory modules (110, 112, 114, 116) may be carried out by grouping only those memory modules with identical performance characteristics into a single memory tier.

The example method of FIG. 1 also includes allocating (104), by the memory management controller (100), a spare block (128, 130, 132, 134) of memory in each memory tier (136, 138, 140). In the example method of FIG. 1, each spare block (128, 130, 132, 134) of memory in each memory tier (136, 138, 140) represents memory that is set aside for use exclusively by the memory management controller (100). In such a way, only the memory management controller (100) may cause data to be written to a particular spare block (128, 130, 132, 134). Each spare block (128, 130, 132, 134) may be of a predetermined size, such that each memory module includes a predetermined number of memory blocks based on the total capacity of the memory module (110, 112, 114, 116) and the block size.

The example method of FIG. 1 also includes identifying (105), by the memory management controller (100), a data characteristic for each of the one or more blocks of data (120, 122, 124, 126) in a plurality of memory tiers (136, 138, 140). In the example method of FIG. 1, a data characteristic of a block of data (120, 122, 124, 126) in a particular memory tier (136, 138, 140) can include, for example, the frequency at which the block of data is accessed, the frequency at which the block of data is written to, and so on. In such an example, identifying (105) a data characteristic for each of the one or more blocks of data (120, 122, 124, 126) in a plurality of memory tiers (136, 138, 140) may therefore be carried out, for example, by tracking the number of times each block of data (120, 122, 124, 126) in each memory tier (136, 138, 140) is accessed. Readers will appreciate that although the example method of FIG. 1 describes identifying (105) a data characteristic for each of the one or more blocks of data (120, 122, 124, 126) in a plurality of memory tiers (136, 138, 140), the memory management controller (100) may alternatively identify a plurality of data characteristics for each of the one or more blocks of data (120, 122, 124, 126) in a plurality of memory tiers (136, 138, 140).

The example method of FIG. 1 also includes migrating (106), by the memory management controller (100) in dependence upon the operational characteristics of each memory tier (136, 138, 140) and the data characteristic of each of the one or more blocks of data (120, 122, 124, 126) in a plurality of memory tiers (136, 138, 140), data (120) in a first memory tier (136) to the spare block (130) of memory in a second memory tier (138). In the example method of FIG. 1, data (120) in a first memory tier (136) is selected for migration to the spare block (130) of memory in a second memory tier (138) in dependence upon both the operational characteristics of each memory tier (136, 138, 140) and the data characteristic of each of the one or more blocks of data (120, 122, 124, 126) in a plurality of memory tiers (136, 138, 140). In the example method of FIG. 1, data (120) in a first memory tier (136) may be migrated (106) to the second memory tier (138) by writing the data (120) in the first memory tier (136) to the spare block (130) of memory in the second memory tier (138).

Consider an example in which memory access requests directed to the second memory tier (138) can be serviced in a smaller amount of time that memory access requests directed to the first memory tier (136). In such an example, system performance improves when data that is accessed frequently is stored in the second memory tier (138) rather than the first memory tier (136). The memory management controller (100) may therefore utilize a data characteristic for each of the one or more blocks of data (120) in the first memory tier (136) to identify a block of data that is frequently accessed. The memory management controller (100) may further utilize a data characteristic for each of the one or more blocks of data (122) in the second memory tier (138) to identify a block of data that is not frequently accessed. In such an example, the block of data in the first memory tier (136) that is frequently accessed may be migrated from the first memory tier (136) to the second memory tier (138) to take advantage of the faster access times in the second memory tier (138).

The example method of FIG. 1 also includes migrating (108), by the memory management controller (100) in dependence upon the operational characteristics of each memory tier (136, 138, 140) and a data characteristic for each of the one or more blocks of data (120, 122, 124, 126) in a plurality of memory tiers (136, 138, 140), data (122) in the second memory tier (138) to the spare block (128) of memory in the first memory tier (136). In the example method of FIG. 1, data (122) in the second memory tier (138) is selected for migration to the spare block (128) of memory in the first memory tier (136) in dependence upon both the operational characteristics of each memory tier (136, 138, 140) and the data characteristic for each of the one or more blocks of data (120, 122, 124, 126) in a plurality of memory tiers (136, 138, 140). In the example method of FIG. 1, data (122) in the second memory tier (138) may be migrated (108) to the first memory tier (136) by writing the data (122) in the second memory tier (138) to the spare block (128) of memory in the first memory tier (136).

Consider the example described above in which memory access requests directed to the second memory tier (138) can be serviced in a smaller amount of time that memory access requests directed to the first memory tier (136). In such an example, system performance improves when data that is accessed infrequently is stored in the first memory tier (136) rather than the second memory tier (138). The memory management controller (100) may therefore utilize the data characteristics for each of the one or more blocks of data (122) in the second memory tier (138) to identify a block of data that is infrequently accessed. In such an example, the block of data in the second memory tier (138) that is infrequently accessed may be migrated from the second memory tier (138) to the first memory tier (136) to take advantage of the faster access times in the second memory tier (138).

Figure 2:
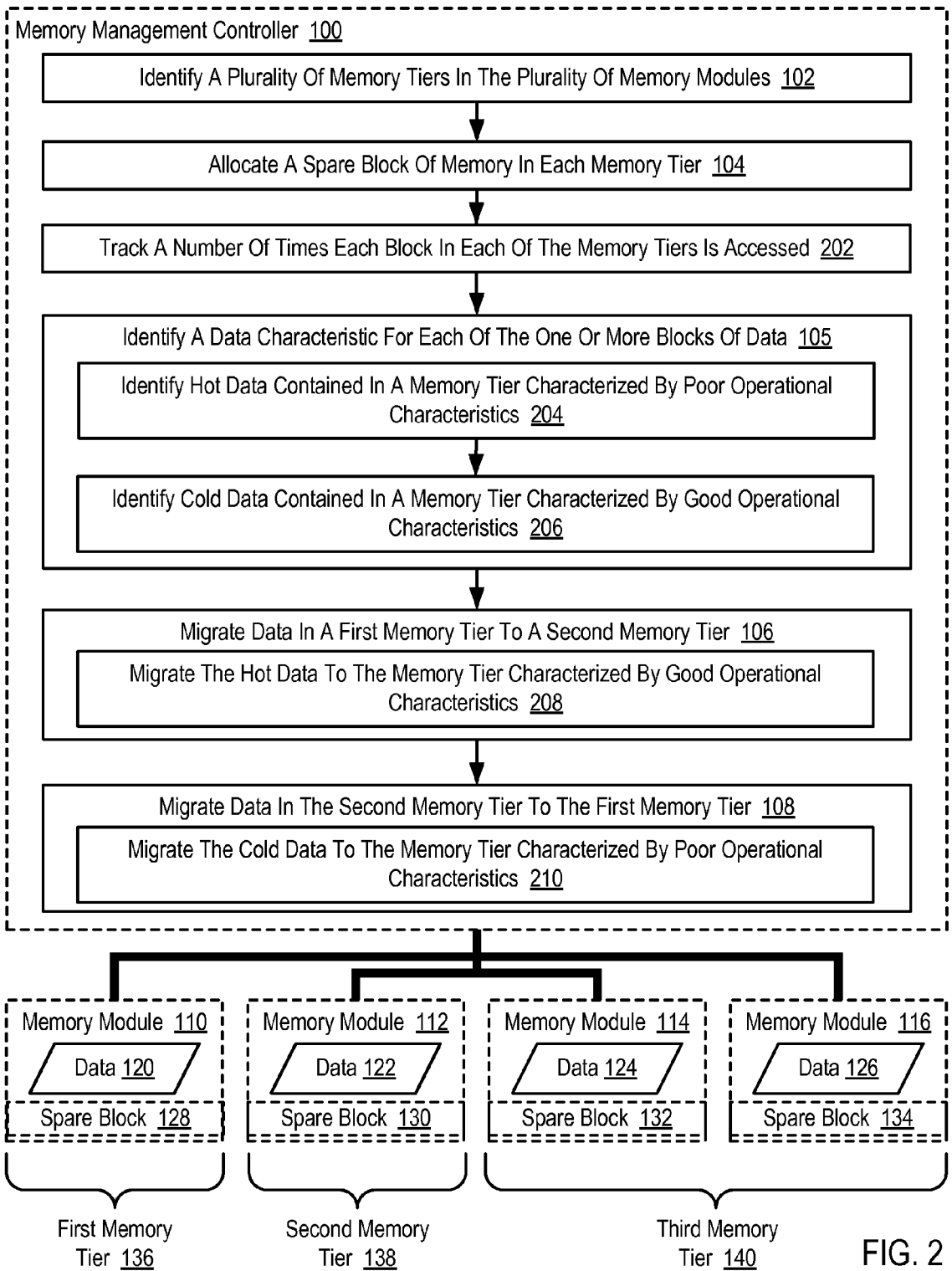
FIG. 2 sets forth a flow chart illustrating an additional example method for operating a memory management controller according to embodiments of the present invention.

For further explanation, FIG. 2 sets forth a flow chart illustrating an additional example method for operating a memory management controller (100) according to embodiments of the present invention. The example method of FIG. 2 is similar to the example method of FIG. 1, as it also includes identifying (102) a plurality of memory tiers (136, 138, 140) in the plurality of memory modules (110, 112, 114, 116), allocating (104) a spare block (128, 130, 132, 134) of memory in each memory tier (136, 138, 140), identifying (105) a data characteristic for each of the one or more blocks of data (120, 122, 124, 126) in a plurality of memory tiers (136, 138, 140), migrating (106) data (120) in a first memory tier (136) to the spare block (130) of memory in a second memory tier (138), and migrating (108) data (122) in the second memory tier (138) to the spare block (128) of memory in the first memory tier (136).

The example method of FIG. 2 also includes tracking (202), by the memory management controller (100), a number of times each block in each of the memory tiers (136, 138, 140) is accessed. In the example method of FIG. 2, the memory management controller (100) may track (202) the number of times each block in each of the memory tiers (136, 138, 140) is accessed through the use of a counter. In such an example, the counter may be maintained in a page table or other data repository and associated with a particular block in each of the memory tiers (136, 138, 140). In such a way, the memory management controller (100) may retain information that is useful in identifying frequently accessed blocks as well as infrequently accessed blocks.

In the example method of FIG. 2, identifying (105) a data characteristic for each of the one or more blocks of data (120, 122, 124, 126) in a plurality of memory tiers (136, 138, 140) includes identifying (204), by the memory management controller (100), hot data contained in a memory tier (136, 138, 140) characterized by poor operational characteristics. In the example method of FIG. 2, 'hot data' represents data that is being accessed frequently. The threshold for determining whether data is 'hot' may be a relative threshold such that, for example, the 5% of data blocks that are accessed most frequently may represent 'hot data.' Alternatively, the threshold for determining whether data is 'hot' may be an absolute threshold such that, for example, any data blocks that are accessed more than 10 times per minute represent 'hot data.' In such a way, identifying (204) hot data contained in a particular memory tier (136, 138, 140) may be carried out by comparing the number of times each block in a memory tier (136, 138, 140) has been accessed to such a predetermined threshold for determining whether data is 'hot.'

In the example method of FIG. 2, hot data contained in a memory tier (136, 138, 140) that is characterized by poor operational characteristics is identified (204). In such an example, the threshold for determining whether a memory tier (136, 138, 140) is characterized by 'poor operational characteristics' may be a relative threshold, for example, such that the memory tiers (136, 138, 140) whose operational characteristics are worse than 50% of all memory tiers (136, 138, 140) are deemed to be characterized by 'poor operational characteristics.' Alternatively, the threshold for determining whether a memory tier (136, 138, 140) is characterized by 'poor operational characteristics' may be an absolute threshold such that only one memory tier (136, 138, 140)—the memory tier (136, 138, 140) whose operational characteristics are worse than all other memory tiers (136, 138, 140)—is deemed to be characterized by 'poor operational characteristics.'

Consider an example in which the relevant operational characteristic of a memory tier (136, 138, 140) includes only the amount of time required by each memory tier (136, 138, 140) to service a memory access request. In such an example, identifying (204) hot data contained in a memory tier (136, 138, 140) characterized by poor operational characteristics results in the memory management controller (100) identifying frequently accessed blocks of memory that reside in a memory tier (136, 138, 140) that services memory access requests slowly relative to other memory tiers (136, 138, 140). Readers will appreciate that storing frequently accessed data in slow memory results in poor system performance, and as such, it is desirable to move such heavily accessed data to faster memory.

In the example method of FIG. 2, identifying (105) a data characteristic for each of the one or more blocks of data (120, 122, 124, 126) in a plurality of memory tiers (136, 138, 140) can also include identifying (206), by the memory management controller (100), cold data contained in a memory tier (136, 138, 140) characterized by good operational characteristics. In the example method of FIG. 2, 'cold data' represents data that is being accessed infrequently. The threshold for determining whether data is 'cold' may be a relative threshold such that, for example, the 5% of data blocks that are accessed least frequently may represent 'cold data.'

Alternatively, the threshold for determining whether data is 'cold' may be an absolute threshold such that, for example, any data blocks that are accessed less than 1 time per minute represent 'cold data.' In such a way, identifying (206) cold data contained in a particular memory tier (136, 138, 140) may be carried out by comparing the number of times each block in a memory tier (136, 138, 140) has been accessed to such a predetermined threshold for determining whether data is 'cold.'

In the example method of FIG. 2, cold data contained in a memory tier (136, 138, 140) that is characterized by good operational characteristics is identified (206). In such an example, the threshold for determining whether a memory tier (136, 138, 140) is characterized by 'good operational characteristics' may be a relative threshold, for example, such that the memory tiers (136, 138, 140) whose operational characteristics are better than 50% of all memory tiers (136, 138, 140) are deemed to be characterized by 'good operational characteristics.' Alternatively, the threshold for determining whether a memory tier (136, 138, 140) is characterized by 'good operational characteristics' may be an absolute threshold such that only one memory tier (136, 138, 140)— the memory tier (136, 138, 140) whose operational characteristics are better than all other memory tiers (136, 138, 140)—is deemed to be characterized by 'good operational characteristics.'

Consider an example in which the relevant operational characteristic of a memory tier (136, 138, 140) includes only the amount of time required by each memory tier (136, 138, 140) to service a memory access request. In such an example, identifying (206) cold data contained in a memory tier (136, 138, 140) characterized by good operational characteristics results in the memory management controller (100) identifying infrequently accessed blocks of memory that reside in a memory tier (136, 138, 140) that services memory access requests quickly relative to other memory tiers (136, 138, 140). Readers will appreciate that storing infrequently accessed data in fast memory results in poor system performance as the fast memory could be better utilized. As such, it is desirable to move such infrequently accessed data to slower memory, thereby freeing faster memory to store heavily accessed data.

In the example method of FIG. 2, migrating (106) data (120) in a first memory tier (136) to the spare block (130) of memory in a second memory tier (138) can include migrating (208) the hot data to the memory tier (136, 138, 140) characterized by good operational characteristics. In the example method of FIG. 2, migrating (208) the hot data to the memory tier (136, 138, 140) characterized by good operational characteristics may be carried out by copying the hot data from the memory tier (136, 138, 140) characterized by poor operational characteristics, writing the hot data to a memory tier (136, 138, 140) characterized by good operational characteristics, and freeing the memory in the memory tier (136, 138, 140) characterized by poor operational characteristics that contained the hot data.

In the example method of FIG. 2, migrating (108) data (122) in the second memory tier (138) to the spare block (128) of memory in the first memory tier (136) can include migrating (210) the cold data to the memory tier (136, 138, 140) characterized by poor operational characteristics. In the example method of FIG. 2, migrating (210) the cold data to the memory tier (136, 138, 140) characterized by poor operational characteristics may be carried out, for example, by copying the cold data from the memory tier (136, 138, 140) characterized by good operational characteristics, writing the cold data to a memory tier (136, 138, 140) characterized by poor operational characteristics, and freeing the memory in the memory tier (136, 138, 140) characterized by good operational characteristics that contained the cold data.

Figure 3:
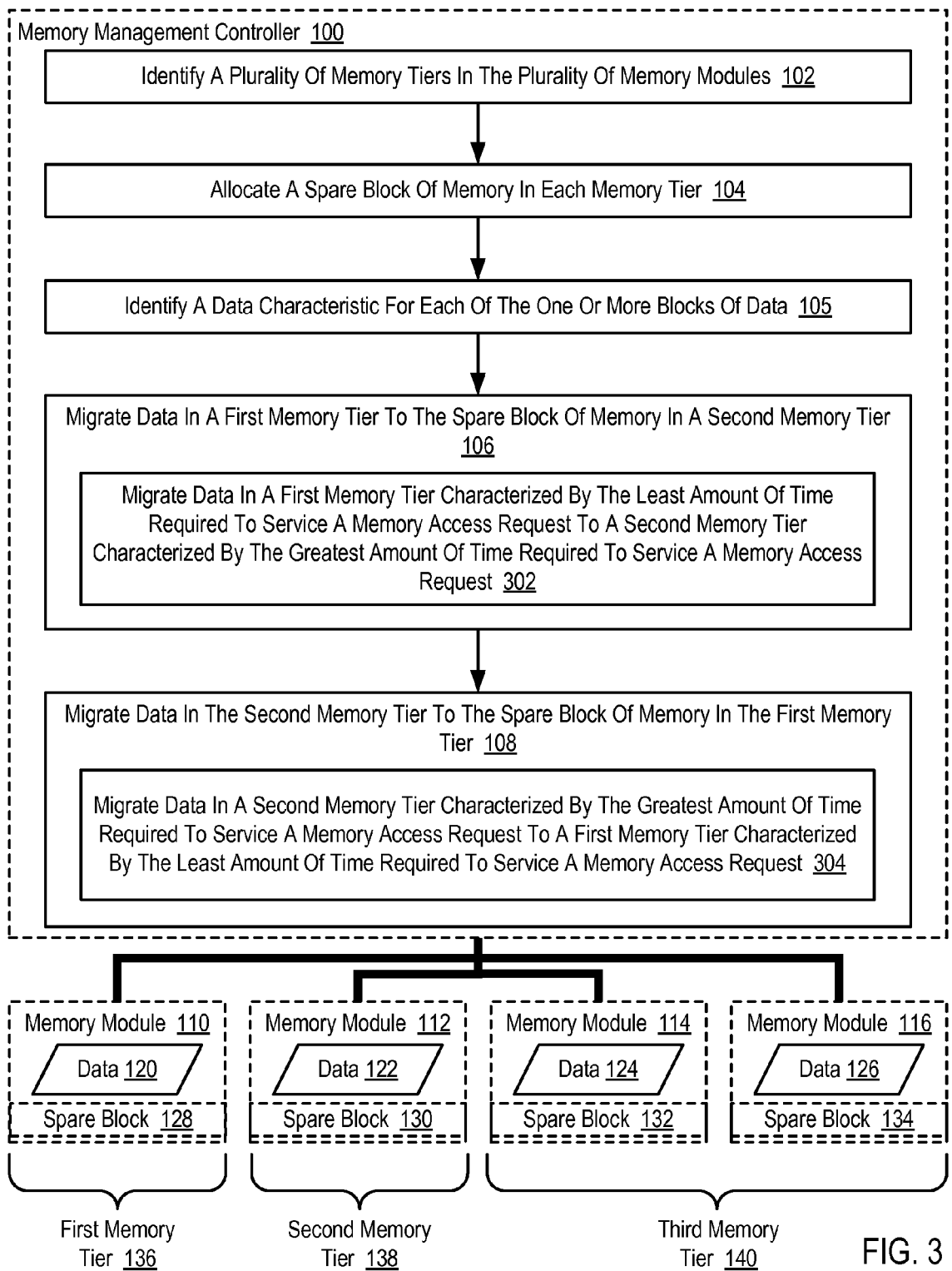
FIG. 3 sets forth a flow chart illustrating an additional example method for operating a memory management controller according to embodiments of the present invention.

For further explanation, FIG. 3 sets forth a flow chart illustrating an additional example method for operating a memory management controller (100) according to embodiments of the present invention. The example method of FIG. 3 is similar to the example method of FIG. 1, as it also includes identifying (102) a plurality of memory tiers (136, 138, 140) in the plurality of memory modules (110, 112, 114, 116), allocating (104) a spare block (128, 130, 132, 134) of memory in each memory tier (136, 138, 140), identifying (105) a data characteristic for each of the one or more blocks of data (120, 122, 124, 126) in a plurality of memory tiers (136, 138, 140), migrating (106) data (120) in a first memory tier (136) to the spare block (130) of memory in a second memory tier (138), and migrating (108) data (122) in the second memory tier (138) to the spare block (128) of memory in the first memory tier (136).

For ease of explanation, assume in FIG. 3 that the relevant operational characteristics of each memory tier (136, 138, 140) includes only an amount of time required to service a memory access request. In the example of FIG. 3, assume that the first memory tier (136) can service memory access requests in the shortest period of time, the second memory tier (138) can service memory access requests in the longest period of time, and the third memory tier (138) can service memory access requests in an intermediate period of time that is slow than the first memory tier (136) but faster than the second memory tier (138).

In the example method of FIG. 3, migrating (106) data (120) in a first memory tier (136) to the spare block (130) of memory in a second memory tier (138) can include migrating (302) data (120) in a first memory tier (136) characterized by the least amount of time required to service a memory access request to a second memory tier (138) characterized by the greatest amount of time required to service a memory access request. In the example method of FIG. 3, migrating (302) data (120) in a first memory tier (136) characterized by the least amount of time required to service a memory access request to a second memory tier (138) characterized by the greatest amount of time required to service a memory access request would be desirable when the data (120) in a first memory tier (136) is not accessed frequently. In view of the fact that the first memory tier (136) is characterized by the least amount of time required to service a memory access request, infrequently accessed data (120) in the first memory tier (136) can be moved to slower memory such that the memory in the first memory tier (136) can be reserved for more frequently accessed data.

In the example method of FIG. 3, migrating (108) data (122) in the second memory tier (138) to the spare block (128) of memory in the first memory tier (136) can include migrating (304) data (122) in a second memory tier (138) characterized by the greatest amount of time required to service a memory access request to a first memory tier (136) characterized by the least amount of time required to service a memory access request. In the example method of FIG. 3, migrating (304) data (122) in a second memory tier (138) characterized by the greatest amount of time required to service a memory access request to a first memory tier (136) characterized by the least amount of time required to service a memory access request would be desirable when the data (122) in a second memory tier (138) is accessed frequently. In view of the fact that the second memory tier (138) is characterized by the greatest amount of time required to service a memory access request, frequently accessed data (122) in the second memory tier (138) can be moved to faster memory to reduce the amount of time required to access such frequently accessed data (122).

Figure 4:
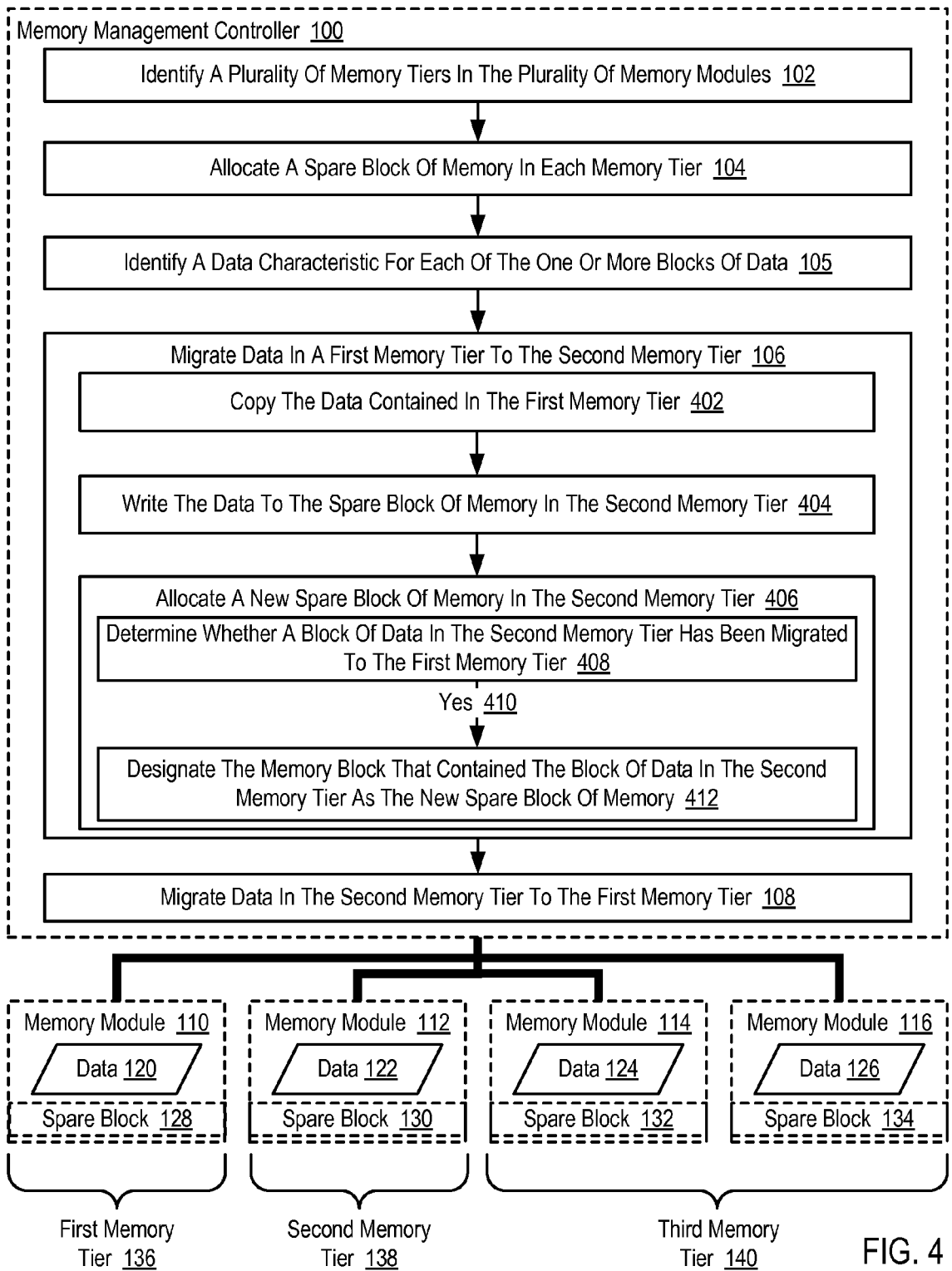
FIG. 4 sets forth a flow chart illustrating an additional example method for operating a memory management controller according to embodiments of the present invention.

For further explanation, FIG. 4 sets forth a flow chart illustrating an additional example method for operating a memory management controller (100) according to embodiments of the present invention. The example method of FIG. 4 is similar to the example method of FIG. 1, as it also includes identifying (102) a plurality of memory tiers (136, 138, 140) in the plurality of memory modules (110, 112, 114, 116), allocating (104) a spare block (128, 130, 132, 134) of memory in each memory tier (136, 138, 140), identifying (105) a data characteristic for each of the one or more blocks of data (120, 122, 124, 126) in a plurality of memory tiers (136, 138, 140), migrating (106) data (120) in a first memory tier (136) to the spare block (130) of memory in a second memory tier (138), and migrating (108) data (122) in the second memory tier (138) to the spare block (128) of memory in the first memory tier (136).

In the example method of FIG. 4, migrating (106) data (120) in a first memory tier (136) to the spare block (130) of memory in a second memory tier (138) can include copying (402), by the memory management controller (100), the data (120) contained in the first memory tier (136). In the example method of FIG. 4, copying (402) the data (120) contained in the first memory tier (136) may be carried out, for example, by the memory management controller (100) reading the data (120) from the appropriate address in the memory module (110) of the first memory tier (136) and retaining a copy of the data (120) in local memory on the memory management controller (100).

In the example method of FIG. 4, migrating (106) data (120) in a first memory tier (136) to the spare block (130) of memory in a second memory tier (138) can also include writing (404), by the memory management controller (100), the data (120) to the spare block (130) of memory in the second memory tier (138). In the example method of FIG. 4, writing (404) the data (120) to the spare block (130) of memory in the second memory tier (138) may be carried out, for example, by the memory management controller (100) writing the data (120) to an address in the memory module (112) of the second memory tier (138) that corresponds to the address of the spare block (130) of memory in the second memory tier (138).

In the example method of FIG. 4, migrating (106) data (120) in a first memory tier (136) to the spare block (130) of memory in a second memory tier (138) can also include allocating (406), by the memory management controller (100), a new spare block of memory in the second memory tier (138). In the example method of FIG. 4, because data (120) formerly in the first memory tier (136) has been migrated (106) to the spare block (130) of memory in a second memory tier (138), the second memory tier (138) no longer includes a spare block of memory that is available to the memory management controller (100). As such, the memory management controller (100) can allocate a new spare block of memory in the second memory tier (138).

In the example method of FIG. 4, allocating (406), by the memory management controller (100), a new spare block of memory in the second memory tier (138) can include determining (408), by the memory management controller (100), whether a block of data (122) in the second memory tier (138) has been migrated to the first memory tier (136). In the example method of FIG. 4, when a block of data (122) in the second memory tier (138) has been migrated to the first memory tier (136), the portion of memory in the second memory tier (138) that contained the block of data (122) can become available for reallocation. In particular, the portion of memory in the second memory tier (138) that contained the block of data (122) can be available to be reallocated as the new spare block of memory in the second memory tier (138).

In the example method of FIG. 4, allocating (406), by the memory management controller (100), a new spare block of memory in the second memory tier (138) can include designating (412) the memory block that contained the block of data (122) in the second memory tier (138) as the new spare block of memory. In the example of FIG. 4, designating (412) the memory block that contained the block of data (122) in the second memory tier (138) as the new spare block of memory is carried out in response to affirmatively (410) determining that the block of data (122) in the second memory tier (138) has been migrated to the first memory tier (138).

Figure 5:
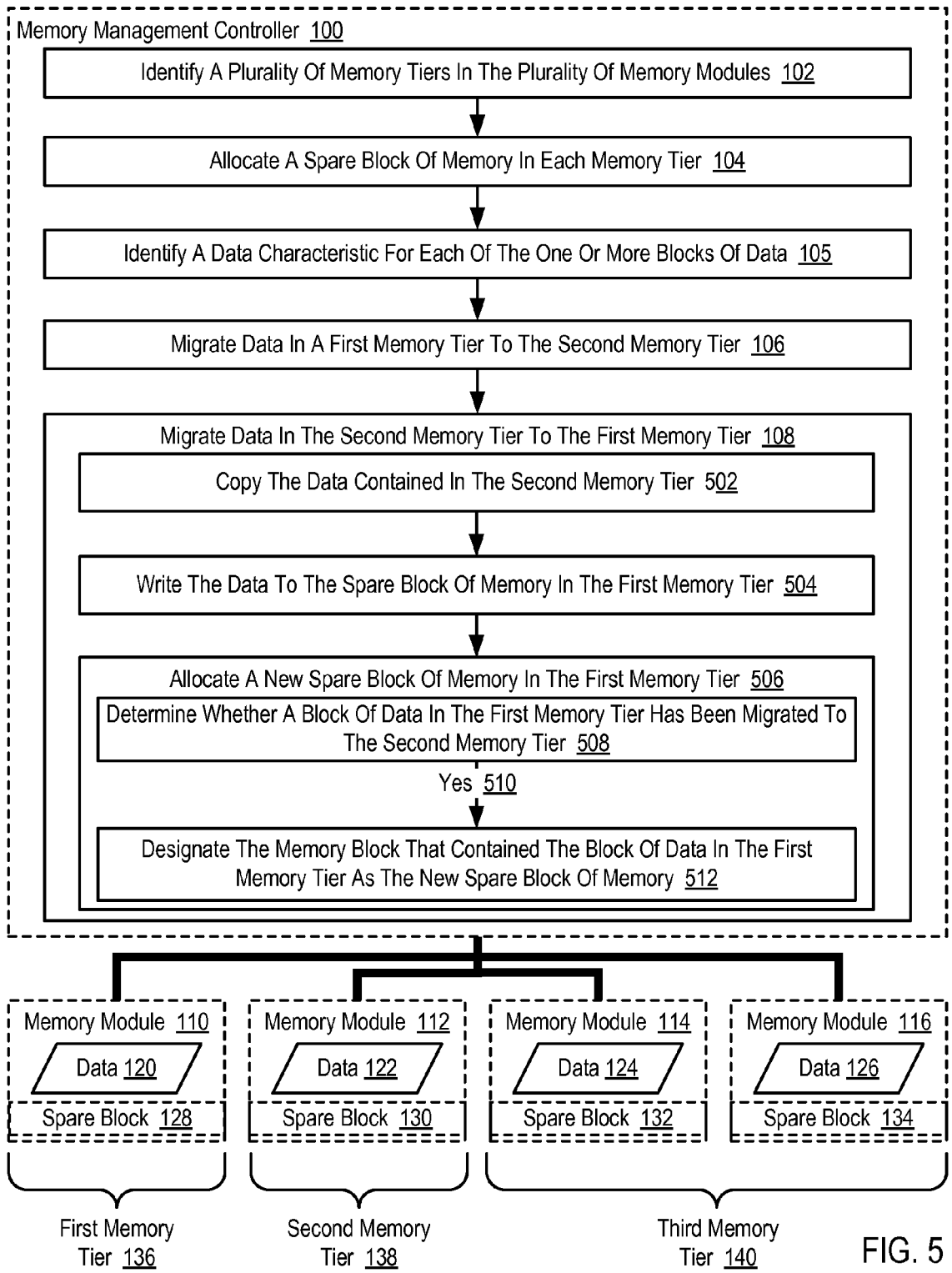
FIG. 5 sets forth a flow chart illustrating an additional example method for operating a memory management controller according to embodiments of the present invention.

For further explanation, FIG. 5 sets forth a flow chart illustrating an additional example method for operating a memory management controller (100) according to embodiments of the present invention. The example method of FIG. 5 is similar to the example method of FIG. 1, as it also includes identifying (102) a plurality of memory tiers (136, 138, 140) in the plurality of memory modules (110, 112, 114, 116), allocating (104) a spare block (128, 130, 132, 134) of memory in each memory tier (136, 138, 140), identifying (105) a data characteristic for each of the one or more blocks of data (120, 122, 124, 126) in a plurality of memory tiers (136, 138, 140), migrating (106) data (120) in a first memory tier (136) to the spare block (130) of memory in a second memory tier (138), and migrating (108) data (122) in the second memory tier (138) to the spare block (128) of memory in the first memory tier (136).

In the example method of FIG. 5, migrating (108) data (122) in the second memory tier (138) to the spare block (128) of memory in the first memory tier (136) can include copying (502), by the memory management controller (100), the data contained (122) in the second memory tier (138). In the example method of FIG. 5, copying (502) the data contained (122) in the second memory tier (138) may be carried out, for example, by the memory management controller (100) reading the data (122) from the appropriate address in the memory module (112) of the second memory tier (138) and retaining a copy of the data (122) in local memory on the memory management controller (100).

In the example method of FIG. 5, migrating (108) data (122) in the second memory tier (138) to the spare block (128) of memory in the first memory tier (136) can also include writing (504), by the memory management controller (100), the data (122) to the spare block (128) of memory in the first memory tier (136). In the example method of FIG. 5, writing (504) the data (122) to the spare block (128) of memory in the first memory tier (136) may be carried out, for example, by the memory management controller (100) writing the data (122) to an address in the memory module (110) of the first memory tier (136) that corresponds to the address of the spare block (128) of memory in the first memory tier (136).

In the example method of FIG. 5, migrating (108) data (122) in the second memory tier (138) to the spare block (128) of memory in the first memory tier (136) can also include allocating (506), by the memory management controller (100), a new spare block of memory in the first memory tier (136). In the example method of FIG. 5, because data (122) formerly in the second memory tier (138) has been migrated (108) to the spare block (128) of memory in the first memory tier (136), the first memory tier (136) no longer includes a spare block of memory that is available to the memory management controller (100). As such, the memory management controller (100) can allocate a new spare block of memory in the first memory tier (136).

In the example method of FIG. 5, allocating (506) a new spare block of memory in the first memory tier (136) can include determining (508), by the memory management controller (100), whether a block of data (120) in the first memory tier (136) has been migrated to the second memory tier (138). In the example method of FIG. 5, when a block of data (120) in the first memory tier (136) has been migrated to the second memory tier (138), the portion of memory in the first memory tier (136) that contained the block of data (120) can become available for reallocation. In particular, the portion of memory in the first memory tier (136) that contained the block of data (120) can be available to be reallocated as the new spare block of memory in the first memory tier (136).

In the example method of FIG. 5, allocating (506) a new spare block of memory in the first memory tier (136) can include designating (512) the memory block that contained the block of data (120) in the first memory tier (136) as the new spare block of memory. In the example method of FIG. 5, designating (512) the memory block that contained the block of data (120) in the first memory tier (136) as the new spare block of memory is carried out in response to affirmatively (510) determining that the block of data (120) in the first memory tier (136) has been migrated to the second memory tier (138).

Figure 6:
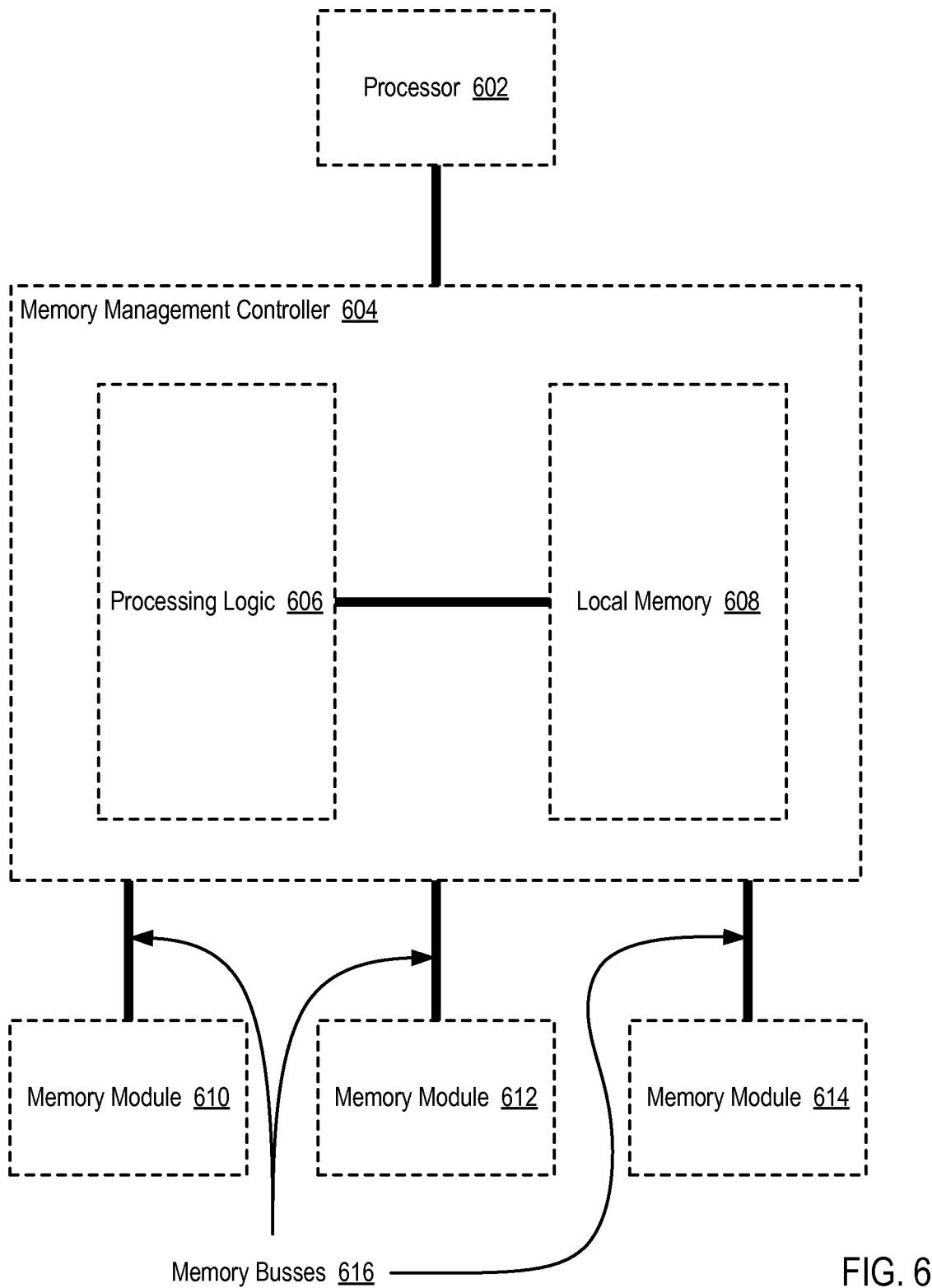
FIG. 6 sets forth a block diagram of a memory management controller according to embodiments of the present invention.

For further explanation, FIG. 6 sets forth a block diagram of a memory management controller (604) according to embodiments of the present invention. The memory management controller (604) of FIG. 6 may be embodied, for example, as automated computing machinery such as an ASIC, FPGA, or other form of computer circuitry. The memory management controller (604) of FIG. 6 is operatively coupled to one or more memory modules (610, 612, 614), for example, via memory busses (616). In the example of FIG. 6, the memory busses (616) may be embodied as a double data rate fourth generation ('DDR4') compliant bus, a double data rate third generation ('DDR3') compliant bus, or other memory bus.

The one or more memory modules (610, 612, 614) of FIG. 6 may be embodied, for example, as a DIMM, SIMM, DRAM DIMM, SDRAM DIMM, SCM DIMM, DDR4 SDRAM DIMM, or other form of computer memory. The memory management controller (604) of FIG. 6 may therefore facilitate memory access requests between the memory modules (610, 612, 614) and other computing hardware such as a computer processor (602). Although the memory management controller (604) of FIG. 6 is depicted as being directly connected to the memory modules (610, 612, 614), readers will appreciate that the memory management controller (604) of FIG. 6 may be indirectly connected to the memory modules (610, 612, 614), for example, through additional memory management modules (not shown).

The memory management controller (604) of FIG. 6 can include processing logic (606) such as a digital circuit and local memory (608). The processing logic (606) of FIG. 6 may be configured to identify a plurality of memory tiers in the plurality of memory modules. In the example of FIG. 6, each memory tier may be characterized by different operational characteristics. Such operational characteristics can include, for example, the amount of time required to service a memory access request, the expected amount of times a memory module (610, 612, 614) may be written to prior to wearing out or failing, whether the memory module (610, 612, 614) represents non-volatile storage or volatile storage, and so on. In such a way, memory modules (610, 612, 614) that include identical operational characteristics may be grouped into the same memory tier.

Consider an example in which the relevant operational characteristic is the amount of time required to service a memory access request. In such an example, assume that memory modules (610, 612) are SDRAM DIMMs that are directly connected to the memory management controller (604) over identical memory buses that are identical in length. In addition, assume that memory module (614) is an SCM DIMM indirectly coupled to the memory management controller (604) through another memory management controller (not shown). In such an example, memory modules (610, 612) may service a memory access request in the same amount of time and therefore may represent one memory tier. In addition, memory module (614) may service a memory access request in a longer period of time than memory modules (610, 612) as memory module (614) is not directly coupled to the memory management controller (604). Furthermore, memory module (614) may require even more time than memory modules (610, 612) to service a memory access request as memory module (614) is a slower form of memory (SCM DIMM) than memory modules (610, 612) (SDRAM DIMM). In such a way, memory module (614) may represent another memory tier. As such, identifying a plurality of memory tiers in the plurality of memory modules (610, 612, 614) may be carried out by grouping only those memory modules with identical performance characteristics into a single memory tier.

The processing logic (606) of FIG. 6 may further be configured to allocate a spare block of memory in each memory tier. Each spare block of memory in each memory tier represents memory that is set aside for use exclusively by the memory management controller (604). In such a way, only the memory management controller (604) may cause data to be written to a particular spare block. Each spare block may be of a predetermined size, such that each memory module (610, 612, 614) includes a predetermined number of memory blocks based on the total capacity of the memory module (610, 612, 614) and the block size.

The processing logic (606) of FIG. 6 may further be configured to track a number of times each block in each of the memory tiers is accessed. The memory management controller (604) may track the number of times each block in each of the memory tiers is accessed through the use of a counter. In such an example, the counter may be maintained in a page table or other data repository and associated with a particular block in each of the memory tiers. In such a way, the memory management controller (604) may retain information that is useful in identifying frequently accessed blocks as well as infrequently accessed blocks.

The processing logic (606) of FIG. 6 may further be configured to identify a data characteristic for each of the one or more blocks of data in a plurality of memory tiers. A data characteristic of a block of data in a particular memory tier can include, for example, the frequency at which the block of data is accessed, the frequency at which the block of data is written to, and so on. In such an example, identifying a data characteristic for each of the one or more blocks of data in a plurality of memory tiers may therefore be carried out, for example, by tracking the number of times each block of data in each memory tier is accessed and identifying blocks that are accessed more frequently and less frequently.

In the example of FIG. 6, the processing logic (606) configured to identify a data characteristic for each of the one or more blocks of data in a plurality of memory tiers may be further configured to identify hot data contained in a memory tier characterized by poor operational characteristics. 'Hot data' represents data that is being accessed frequently. The threshold for determining whether data is 'hot' may be a relative threshold such that, for example, the 5% of data blocks that are accessed most frequently may represent 'hot data.' Alternatively, the threshold for determining whether data is 'hot' may be an absolute threshold such that, for example, any data blocks that are accessed more than 10 times per minute represent 'hot data.' In such a way, identifying hot data contained in a particular memory tier may be carried out by comparing the number of times each block in a memory tier has been accessed to such a predetermined threshold for determining whether data is 'hot.'

In the example of FIG. 6, hot data contained in a memory tier that is characterized by poor operational characteristics is identified. In such an example, the threshold for determining whether a memory tier is characterized by 'poor operational characteristics' may be a relative threshold, for example, such that the memory tiers whose operational characteristics are worse than 50% of all memory tiers are deemed to be characterized by 'poor operational characteristics.' Alternatively, the threshold for determining whether a memory tier is characterized by 'poor operational characteristics' may be an absolute threshold such that only one memory tier—the memory tier whose operational characteristics are worse than all other memory tiers—is deemed to be characterized by 'poor operational characteristics.'

Consider an example in which the relevant operational characteristic of a memory tier includes only the amount of time required by each memory tier to service a memory access request. In such an example, identifying hot data contained in a memory tier characterized by poor operational characteristics results in the memory management controller (604) identifying frequently accessed blocks of memory that reside in a memory tier that services memory access requests slowly relative to other memory tiers. Readers will appreciate that storing frequently accessed data in slow memory results in poor system performance, and as such, it is desirable to move such heavily accessed data to faster memory.

In the example of FIG. 6, the processing logic (606) configured to identify a data characteristic for each of the one or more blocks of data in a plurality of memory tiers may be further configured to identify cold data contained in a memory tier characterized by good operational characteristics. 'Cold data' represents data that is being accessed infrequently. The threshold for determining whether data is 'cold' may be a relative threshold such that, for example, the 5% of data blocks that are accessed least frequently may represent 'cold data.' Alternatively, the threshold for determining whether data is 'cold' may be an absolute threshold such that, for example, any data blocks that are accessed less than 1 time per minute represent 'cold data.' In such a way, identifying cold data contained in a particular memory tier may be carried out by comparing the number of times each block in a memory tier has been accessed to such a predetermined threshold for determining whether data is 'cold.'

In the example of FIG. 6, cold data contained in a memory tier that is characterized by good operational characteristics is identified. In such an example, the threshold for determining whether a memory tier is characterized by 'good operational characteristics' may be a relative threshold, for example, such that the memory tiers whose operational characteristics are better than 50% of all memory tiers are deemed to be characterized by 'good operational characteristics.' Alternatively, the threshold for determining whether a memory tier is characterized by 'good operational characteristics' may be an absolute threshold such that only one memory tier—the memory tier whose operational characteristics are better than all other memory tiers—is deemed to be characterized by 'good operational characteristics.'

Consider an example in which the relevant operational characteristic of a memory tier includes only the amount of time required by each memory tier to service a memory access request. In such an example, identifying cold data contained in a memory tier characterized by good operational characteristics results in the memory management controller (604) identifying infrequently accessed blocks of memory that reside in a memory tier that services memory access requests quickly relative to other memory tiers. Readers will appreciate that storing infrequently accessed data in fast memory results in poor system performance as the fast memory could be better utilized. As such, it is desirable to move such infrequently accessed data to slower memory, thereby freeing faster memory to store heavily accessed data.

The processing logic (606) of FIG. 6 may further be configured to migrate, in dependence upon the operational characteristics of each memory tier and the data characteristic for each of the one or more data blocks in the plurality of memory tiers, data in a first memory tier to the spare block of memory in a second memory tier. Data in a first memory tier is selected for migration to the spare block of memory in a second memory tier in dependence upon both the operational characteristics of each memory tier and the data characteristic of each of the one or more blocks of data in a plurality of memory tiers. Data in a first memory tier may be migrated to the second memory tier by writing the data in the first memory tier to the spare block of memory in the second memory tier.

Consider an example in which memory access requests directed to the second memory tier can be serviced in a smaller amount of time that memory access requests directed to the first memory tier. In such an example, system performance improves when data that is accessed frequently is stored in the second memory tier rather than the first memory tier. The memory management controller (604) may therefore utilize the data characteristic for each of the one or more blocks of data in the first memory tier to identify a block of data that is frequently accessed. The memory management controller (604) may further utilize the data characteristic for each of the one or more blocks of data in the second memory tier to identify a block of data that is not frequently accessed. In such an example, the block of data in the first memory tier that is frequently accessed may be migrated from the first memory tier to the second memory tier to take advantage of the faster access times in the second memory tier.

In the example of FIG. 6, the processing logic configured to migrate data in a first memory tier to the spare block of memory in a second memory tier may be further configured to migrate the hot data to the memory tier characterized by good operational characteristics. Migrating the hot data to the memory tier characterized by good operational characteristics may be carried out by copying the hot data from the memory tier characterized by poor operational characteristics, writing the hot data to a memory tier characterized by good operational characteristics, and freeing the memory in the memory tier characterized by poor operational characteristics that contained the hot data.

In the example of FIG. 6, the processing logic configured to migrate data in a first memory tier to the spare block of memory in a second memory tier may be further configured to migrate data in a first memory tier characterized by the least amount of time required to service a memory access request to a second memory tier characterized by the greatest amount of time required to service a memory access request. Migrating data in a first memory tier characterized by the least amount of time required to service a memory access request to a second memory tier characterized by the greatest amount of time required to service a memory access request would be desirable when the data in a first memory tier is not accessed frequently. In view of the fact that the first memory tier is characterized by the least amount of time required to service a memory access request, infrequently accessed data in the first memory tier can be moved to slower memory such that the memory in the first memory tier can be reserved for more frequently accessed data.

In the example of FIG. 6, the processing logic configured to migrate data in a first memory tier to the spare block of memory in a second memory tier may be further configured to migrate data in a first memory tier characterized by the least amount of time required to copy the data contained in the first memory tier, write the data to the spare block of memory in the second memory tier, and allocate a new spare block of memory in the second memory tier. Copying the data contained in the first memory tier may be carried out, for example, by the memory management controller (604) reading the data from the appropriate address in the memory module of the first memory tier and retaining a copy of the data in local memory (608) on the memory management controller (604). Writing the data to the spare block of memory in the second memory tier may be carried out, for example, by the memory management controller (604) writing the data to an address in the memory module of the second memory tier that corresponds to the address of the spare block of memory in the second memory tier. Furthermore, because data formerly in the first memory tier has been migrated to the spare block of memory in a second memory tier, the second memory tier no longer includes a spare block of memory that is available to the memory management controller (604). As such, the memory management controller (604) can allocate a new spare block of memory in the second memory tier.

In the example of FIG. 6, the processing logic configured to allocate a new spare block of memory in the second memory tier may be further configured to determine whether a block of data in the second memory tier has been migrated to the first memory tier and responsive to determining that the block of data in the second memory tier has been migrated to the first memory tier, designate the memory block that contained the block of data in the second memory tier as the new spare block of memory. In the example of FIG. 6, when a block of data in the second memory tier has been migrated to the first memory tier, the portion of memory in the second memory tier that contained the block of data can become available for reallocation. In particular, the portion of memory in the second memory tier that contained the block of data can be available to be reallocated as the new spare block of memory in the second memory tier.

The processing logic (606) of FIG. 6 may further be configured to migrate, in dependence upon the operational characteristics of each memory tier and the data characteristic for each of the one or more data blocks in the plurality of memory tiers, data in the second memory tier to the spare block of memory in the first memory tier. Data in the second memory tier is selected for migration to the spare block of memory in the first memory tier in dependence upon both the operational characteristics of each memory tier and the data characteristic for each of the one or more blocks of data in a plurality of memory tiers. Data in the second memory tier may be migrated to the first memory tier by writing the data in the second memory tier to the spare block of memory in the first memory tier.

Consider the example described above in which memory access requests directed to the second memory tier can be serviced in a smaller amount of time that memory access requests directed to the first memory tier. In such an example, system performance improves when data that is accessed infrequently is stored in the first memory tier rather than the second memory tier. The memory management controller (604) may therefore utilize the data characteristic for each of the one or more blocks of data in the second memory tier to identify a block of data that is infrequently accessed. In such an example, the block of data in the second memory tier that is infrequently accessed may be migrated from the second memory tier to the first memory tier to take advantage of the faster access times in the second memory tier.

In the example of FIG. 6, the processing logic (606) configured to migrate data in the second memory tier to the spare block of memory in the first memory tier may be further configured to migrate the cold data to the memory tier characterized by poor operational characteristics. Migrating the cold data to the memory tier characterized by poor operational characteristics may be carried out, for example, by copying the cold data from the memory tier characterized by good operational characteristics, writing the cold data to a memory tier characterized by poor operational characteristics, and freeing the memory in the memory tier characterized by good operational characteristics that contained the cold data.

In the example of FIG. 6, the processing logic (606) configured to migrate data in the second memory tier to the spare block of memory in the first memory tier may be further configured to migrate data in a second memory tier characterized by the greatest amount of time required to service a memory access request to a first memory tier characterized by the least amount of time required to service a memory access request. Migrating data in a second memory tier characterized by the greatest amount of time required to service a memory access request to a first memory tier characterized by the least amount of time required to service a memory access request would be desirable when the data in a second memory tier is accessed frequently. In view of the fact that the second memory tier is characterized by the greatest amount of time required to service a memory access request, frequently accessed data in the second memory tier can be moved to faster memory to reduce the amount of time required to access such frequently accessed data.

In the example of FIG. 6, the processing logic (606) configured to migrate data in the second memory tier to the spare block of memory in the first memory tier may be further configured copy the data contained in the second memory tier, write the data to the spare block of memory in the first memory tier, and allocate a new spare block of memory in the first memory tier. Copying the data contained in the second memory tier may be carried out, for example, by the memory management controller (604) reading the data from the appropriate address in the memory module of the second memory tier and retaining a copy of the data in local memory (608) on the memory management controller (604). Writing the data to the spare block of memory in the first memory tier may be carried out, for example, by the memory management controller (604) writing the data to an address in the memory module of the first memory tier that corresponds to the address of the spare block of memory in the first memory tier. Because data formerly in the second memory tier has been migrated to the spare block of memory in the first memory tier, the first memory tier no longer includes a spare block of memory that is available to the memory management controller (604). As such, the memory management controller (604) can allocate a new spare block of memory in the first memory tier.

In the example of FIG. 6, the processing logic (606) configured to allocate a new spare block of memory in the first memory tier may be further configured to determine whether a block of data in the first memory tier has been migrated to the second memory tier and responsive to determining that the block of data in the first memory tier has been migrated to the second memory tier, designate the memory block that contained the block of data in the first memory tier as the new spare block of memory. In the example of FIG. 6, when a block of data in the first memory tier has been migrated to the second memory tier, the portion of memory in the first memory tier that contained the block of data can become available for reallocation. In particular, the portion of memory in the first memory tier that contained the block of data can be available to be reallocated as the new spare block of memory in the first memory tier.

Figure 7:
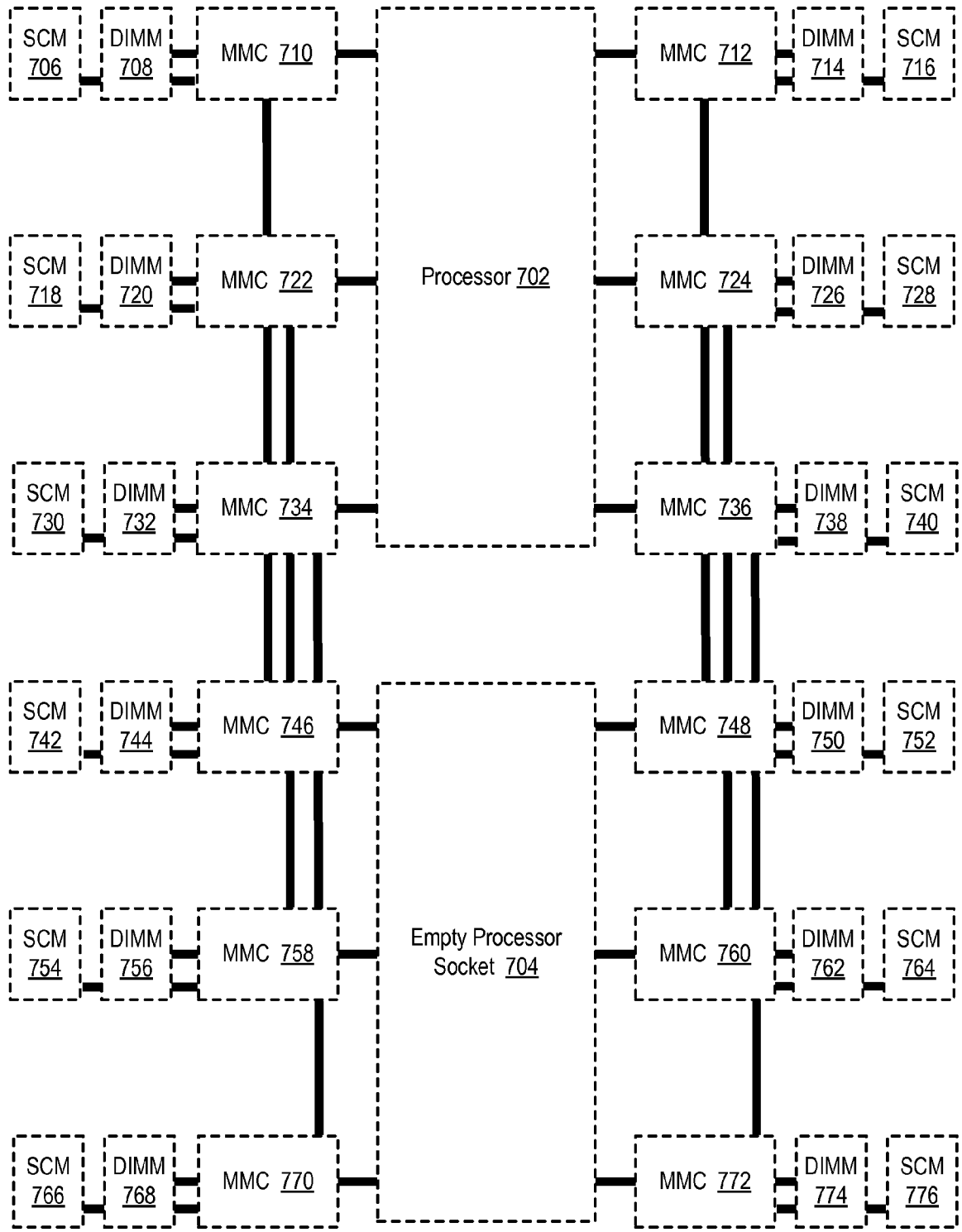
FIG. 7 sets forth a block diagram of a system that includes a plurality of memory management controllers according to embodiments of the present invention.

For further explanation, FIG. 7 sets forth a block diagram of a system that includes a plurality of memory management controllers (710, 712, 722, 724, 734, 736, 746, 748, 758, 760, 770, 772) according to embodiments of the present invention. In the example of FIG. 7, each of memory management controllers (710, 712, 722, 724, 734, 736, 746, 748, 758, 760, 770, 772) is operatively coupled to a plurality of memory modules. For example, in FIG. 7 each of the memory management controllers (710, 712, 722, 724, 734, 736, 746, 748, 758, 760, 770, 772) is coupled to an SDRAM DIMM (708, 714, 720, 726, 732, 738, 744, 750, 756, 760, 768, 774). In addition, in FIG. 7 each of the memory management controllers (710, 712, 722, 724, 734, 736, 746, 748, 758, 760, 770, 772) is coupled to an SCM DIMM (708, 716, 718, 728, 730, 740, 742, 752, 754, 764, 766, 776).

In the example of FIG. 7, some of the memory management controllers (710, 712, 722, 724, 734, 736) are coupled directly to a processor (702). The remaining memory management controllers (746, 748, 758, 760, 770, 772), however, are coupled to an empty processor socket (704). As such, the remaining memory management controllers (746, 748, 758, 760, 770, 772) may be coupled to the processor (702) of FIG. 7 indirectly as the remaining memory management controllers (746, 748, 758, 760, 770, 772) are coupled to one of the memory management controllers (710, 712, 722, 724, 734, 736) that are coupled directly to a processor (702). In such a way, memory management controllers (710, 712, 722, 724, 734, 736, 746, 748, 758, 760, 770, 772) may be coupled to other memory management controllers (710, 712, 722, 724, 734, 736, 746, 748, 758, 760, 770, 772) via a memory bus.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A memory management controller operatively coupled to a plurality of memory modules, the memory management controller including processing logic configured to:
   identify a plurality of memory tiers in the plurality of memory modules, each memory tier characterized by different operational characteristics, wherein the different operational characteristics comprise an expected amount of times a memory module may be written to prior to wearing out or failing;
   allocate a spare block of memory in each memory tier;
   identify a data characteristic for each of one or more blocks of data in the plurality of memory tiers;
   migrate frequently in dependence upon the operational characteristics of each memory tier and the data characteristic for each of the one or more data blocks in the plurality of memory tiers, data in a first memory tier to the spare block of memory in a second memory tier, the data in the first memory_tier less than or equal to the size of the spare block of memory in the second memory tier; and migrate frequently in dependence upon the operational characteristics of each memory tier and the data characteristic for each of the one or more data blocks in the plurality of memory tiers, data in the second memory tier to the spare block of memory in the first memory tier, the data in the second memory tier less than or equal to the size of the spare block of memory in the first memory tier, wherein the different operational characteristics of each memory tier further comprises an amount of time required to service a memory access request in each memory tier.

2. The memory management controller of claim 1 further comprising processing logic configured to track a number of times each block in each of the memory tiers is accessed.

3. The memory management controller of claim 1:

wherein processing logic configured to identify the data characteristic for each of the one or more blocks of data in a plurality of memory tiers further comprises processing logic configured to:

identify hot data contained in a memory tier characterized by poor operational characteristics; and identify cold data contained in a memory tier characterized by good operational characteristics;

wherein processing logic configured to migrate, in dependence upon the operational characteristics of each memory tier and the data characteristic for each of the one or more blocks of data in a plurality of memory tiers, data in a first memory tier to the spare block of memory in a second memory tier includes processing logic configured to migrate the hot data to the memory tier characterized by good operational characteristics; and wherein processing logic configured to migrate, in dependence upon the operational characteristics of each memory tier and the data characteristic for each of the one or more blocks of data in a plurality of memory tiers, data in the second memory tier to the spare block of memory in the first memory tier includes processing logic configured to migrate the cold data to the memory tier characterized by poor operational characteristics.

4. The memory management controller of claim 1 wherein the processing logic configured to migrate, in dependence upon the operational characteristics of each memory tier and the data characteristic for each of the one or more blocks of data in a plurality of memory tiers, data in a first memory tier to the spare block of memory in a second memory tier further comprises processing logic configured to migrate data in a first memory tier characterized by the least amount of time required to service a memory access request to a second memory tier characterized by the greatest amount of time required to service a memory access request.

5. The memory management controller of claim 1 wherein the processing logic configured to migrate, in dependence upon the operational characteristics of each memory tier and the data characteristic for each of the one or more blocks of data in a plurality of memory tiers, data in the second memory tier to the spare block of memory in the first memory tier further comprises processing logic configured to migrate data in a second memory tier characterized by the greatest amount of time required to service a memory access request to a first memory tier characterized by the least amount of time required to service a memory access request.

6. The memory management controller of claim 1 wherein processing logic configured to migrate, in dependence upon the operational characteristics of each memory tier and the data characteristic for each of the one or more blocks of data in a plurality of memory tiers, data in a first memory tier to the spare block of memory in a second memory tier further comprises processing logic configured to:

copy the data contained in the first memory tier;

write the data to the spare block of memory in the second memory tier; and allocate a new spare block of memory in the second memory tier.

7. The memory management controller of claim 6 wherein the processing logic configured to allocate a new spare block of memory in the second memory tier further comprises processing logic configured to:

determine whether a block of data in the second memory tier has been migrated to the first memory tier; and responsive to determining that the block of data in the second memory tier has been migrated to the first memory tier, designate the memory block that contained the block of data in the second memory tier as the new spare block of memory.

8. The memory management controller of claim 1 wherein the processing logic configured to migrate, in dependence upon the operational characteristics of each memory tier and the data characteristic for each of the one or more blocks of data in a plurality of memory tiers, data in the second memory tier to the spare block of memory in the first memory tier further comprises processing logic configured to:

copy the data contained in the second memory tier;

write the data to the spare block of memory in the first memory tier; and allocate a new spare block of memory in the first memory tier.

9. The memory management controller of claim 8 wherein the processing logic configured to allocate a new spare block of memory in the first memory tier further comprises processing logic configured to:

determine whether a block of data in the first memory tier has been migrated to the second memory tier; and responsive to determining that the block of data in the first memory tier has been migrated to the second memory tier, designate the memory block that contained the block of data in the first memory tier as the new spare block of memory.

* * * * *